(12) United States Patent
Uecker

(10) Patent No.: US 7,262,387 B2
(45) Date of Patent: *Aug. 28, 2007

(54) METHOD AND APPARATUS FOR ARC WELDING WITH ARC CONTROL

(75) Inventor: James L. Uecker, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,445

(22) Filed: Sep. 13, 2006

(65) Prior Publication Data

US 2007/0007263 A1 Jan. 11, 2007

Related U.S. Application Data

(63) Continuation of application No. 10/764,278, filed on Jan. 22, 2004, now Pat. No. 7,138,601.

(51) Int. Cl.
*B23K 9/09* (2006.01)
(52) U.S. Cl. .............................. 219/137.71; 219/130.51
(58) Field of Classification Search ............. 219/130.5, 219/130.51, 137.71
See application file for complete search history.

(56) References Cited

U.S. PATENT DOCUMENTS

| | | | |
|---|---|---|---|
| 5,063,282 A | 11/1991 | Gilliland | |
| 5,136,139 A | 8/1992 | Gilliland | |
| 6,107,602 A | 8/2000 | Geissler et al. | |
| 6,121,575 A | 9/2000 | Ott et al. | |
| 7,138,601 B2 * | 11/2006 | Uecker | ................. 219/137.71 |

FOREIGN PATENT DOCUMENTS

JP 58-138569 8/1983

OTHER PUBLICATIONS

Miller S-64M May 2001.
Miller XMT 304 Dec. 2002.

* cited by examiner

*Primary Examiner*—Clifford C. Shaw
(74) *Attorney, Agent, or Firm*—George R. Corrigan

(57) ABSTRACT

A method and apparatus for providing welding power with an arc-width control is disclosed. The power supply includes a power circuit that provides a welding output characterized by a plurality of welding output parameters, and the power circuit receives at least one control input. A controller provides control signals to the power circuit. The controller receives user inputs for arc width and wire feed speed. The controller has an arc width control module that provides control signals that adjust one or more welding output parameters. The adjustment has a gain responsive to the wire feed speed input, such that there are at least three gains over a range of possible wire feed speeds, in one embodiment. The arc width control module provides control signals that adjust at least five welding output parameters in response to the wire feed speed input and the arc-width control input, in another embodiment.

19 Claims, 2 Drawing Sheets

METHOD AND APPARATUS FOR ARC WELDING WITH ARC CONTROL

RELATED APPLICATIONS

This is a continuation of, and claims the benefit of the filing date of, U.S. patent application Ser. No. 10/764,278, filed on Jan. 22, 2004, which issued Nov. 21, 2006 as Pat. No. 7,138,601.

FIELD OF THE INVENTION

The present invention relates generally to the art of arc welding. More specifically, it relates to arc welding with control of arc parameters.

BACKGROUND OF THE INVENTION

Electric arc welding is well known, and is performed with a variety of processes using a variety of types of equipment. One electric arc welding process is a pulse spray process, which is typically performed using a wire feeder and a power supply. An example of a prior art power supply used in pulse spray welding is a Miller S64M™ wire feeder. The Miller S64M™ wire feeder may be used with a Miller XMT304™ power supply.

Typically, in pulse spray processes, power is provided from the power supply to the wire feeder, and the wire feeder provides the wire and power to the arc. The wire feeder typically includes a controller, which may be part of or separate from the wire feeder, and which controls the wire feed speed based on a user-selected input. Additionally, the controller provides a command signal to the power supply which causes the power supply to output a current and voltage at a desired magnitude. The command is produced at least in response to a user-selected wire feed speed. The current amplitude is often controlled as a function of time, switching between a background current and a peak current, thus creating a pulsed output.

The welding process is often controlled by controlling various welding parameters. For example, the pulse spray process is typically controlled by controlling such welding parameters as peak amps, background amps, pulse width, voltage, ramps, and frequency. The parameters are typically controlled using a controller which provides control signals to the wire feeder (or power supply). Some welding power supplies control the ramp up and ramp down (transition from background to peak, or peak to background). Also some welding power supplies provide an adaptive output voltage where the voltage is controlled to provide a desired or constant arc length. As used herein, welding parameters refer to parameters of the welding power output, such as peak amps, background amps, frequency, pulse width, voltage (constant or adaptive) ramp up, and ramp down. Adaptive voltage, or adaptive arc length, as used herein includes adjusting (changing or scaling) an output parameter, pulse frequency modulation for example, to maintain a constant or desired arc length. Because these welding parameters are used to control the output it may be said that the output is characterized by a plurality of output parameters.

Some wire feeder controllers include factory programs which preset various welding parameters. The values for these parameters are stored by the controller (often in digital or other types of memory). Also, many controllers allow the user to store user-created programs which store user-selected welding parameters. In such a case, the user teaches or sets the desired values for welding parameters, and stores them in the memory.

When the user wishes to access either the factory preset or the user-created programs, they are individually selected using some type of digital interface. Then, the controller commands the power supply to provide power at the called for current, peak current, background current, frequency, ramps and pulse width, thus providing the desired welding parameters.

Different types of welding require different types of arc characteristics (such as the plasma cone angle\width and intensity, hereafter referred to as arc width). For example, flat, horizontal down, welding typically may be performed using a relatively wide arc. Conversely, overhead welding, or welding in other difficult or inconvenient physical positions, often requires a narrow arc.

The preset factory programs are typically set to provide for welding with a wide arc, since this is the one most inexperienced welders will use. To access the narrower arc the welder must adjust the welding parameters manually and individually until the desired arc is obtained. It may be necessary to decrease one parameter as another parameter is increased, without changing other arc characteristics. Without changing other arc characteristics, as used herein, refers to not changing an arc characteristic from the standpoint of the user and/or in such a way the arc is adversely affected, such as not changing arc length to the extent the weld is adversely affected or the user notices the change.

However, many welders lack the experience to know how to properly adjust the various parameters, and in particular welders do not understand the interaction between adjusting various parameters. For example, to decrease arc width, frequency is increased. However, increasing frequency also increases arc length. Many welders do not know this, nor do they know how to adjust the other welding parameters to offset the effect of changing frequency on arc length.

Some prior art systems provide for the user to automatically adjust arc width. As described in U.S. Pat. No. 6,121,575 (owned by the assignee of the present invention), the system adjusts welding parameters with a single knob (i.e. a single arc control input) that controls arc width (or a different arc characteristic) without adversely affecting some other arc characteristics. Specifically, the arc width adjustment is made by adjusting three or four welding parameters simultaneously, such that one or more other characteristics of the arc are minimally affected. Simultaneous, in this context, means at the same time from the standpoint of the user and the welding process. They might occur one after the other, but so far as the user observes by watching the welding process, they occur at the same time.

A single digital knob (or other input device such as a digital input panel, keyboard, analog knob, sliding switch, etc) on the controller allows the user to select between an arc width adjustment of 0 and 20. An arc width adjustment of 0 is no arc width adjustment, and an arc width adjustment of 20 is the maximum arc width adjustment (narrow arc cone) in the preferred embodiment. No adjustment is having the parameters be as they were in the original program, which is typically best for flat, horizontal down, welding (i.e., using a wide arc).

While the system described in U.S. Pat. No. 6,121,575 is a considerable advance over the prior art, it only controls three or four parameters, and does not control adaptive arc length (output voltage) in response to the arc width setting. Thus, when changing arc width the arc length other characteristics may remain constant in some circumstances, but under other circumstances changing the arc width will also change the arc length. Also, that system provided two gains, one for over wire feed speeds of more than 225 IPM, and one for less than 225 IPM. This caused a step change from above and below 225 IPM, which was noticeable at the arc.

Accordingly, it is desirable that a welding power supply and wire feeder include a controller that allows the user to adjust the arc width using a single knob, such that more five or more welding parameters, preferably including arc voltage, are adjusted to obtain a desired arc width, while maintaining one or more other characteristics of the arc, preferably including arc length.

SUMMARY OF THE PRESENT INVENTION

According to a first aspect of the invention a welding power supply has an arc-width control. The power supply includes a power circuit that provides a welding output characterized by a plurality of welding output parameters, and the power circuit receives at least one control input. A controller provides control signals to the power circuit. The controller receives user inputs for arc width and wire feed speed. The controller has an arc width control module that provides control signals that adjust one or more welding output parameters. The adjustment has a gain responsive to the wire feed speed input, such that there are at least three gains over a range of possible wire feed speeds.

According to a second aspect of the invention the welding power supply with arc-width control includes a power circuit that provides a welding output characterized by at least five welding output parameters, and the power circuit receives at least one control input. A controller provides control signals to the power circuit. The controller receives user inputs for arc width and wire feed speed. The controller has an arc width control module that provides control signals that adjust at least five welding output parameters in response to the wire feed speed input and the arc-width control input.

According to a third aspect of the invention a welding power supply includes a source of power with at least one power source control input. A wire feeder is connected to the source of power and has at least one wire feeder control input. A controller has welding parameter outputs connected to the power source control input and the wire feeder control input. The controller also has an arc width input, and at least five welding parameters are simultaneously controlled in response to the arc width input such that a desired arc width is obtained, without changing other arc characteristics.

The adjustment gain varies over the entire range of possible wire feed speeds in accordance with one embodiment of the invention.

The adjustment gains have at least three taught points for a given wire feed speed in other embodiments, and the gains may be interpolated between the at least three taught points.

The plurality of welding output parameters include peak amps, background amps, pulse width, frequency, adaptive voltage, ramp up and ramp down, and the adjustment includes adjustments for at least three, five, six or more of the parameters in other embodiments.

Other principal features and advantages of the invention will become apparent to those skilled in the art upon review of the following drawings, the detailed description and the appended claims.

Figure 1:
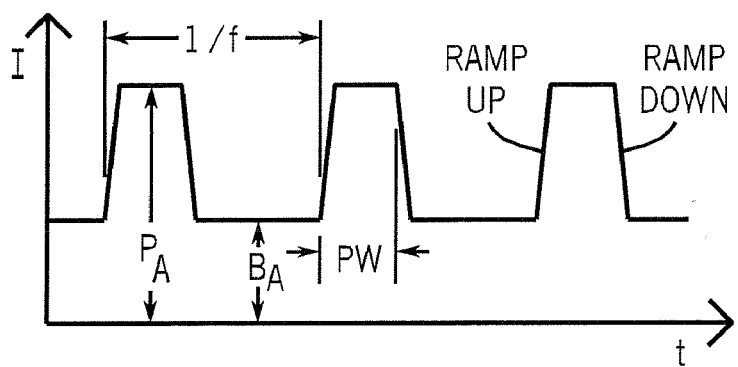
FIG. 1 is a waveform of a typical welding output for a pulsed arc welding process such as that used in the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular implementation and a particular flow chart for use with a particular power supply and wire feeder, it should be understood at the outset that the invention may also be employed with other flow charts, routines, values, limits, parameters, and equipment.

The invention generally includes adjusting welding parameters with a single input (i.e. a single arc width control input) that controls arc width without adversely affecting other arc characteristics, such as arc length, i.e., arc width control. (Power and/or deposition rate do not change in alternative embodiments.) For example, in the preferred embodiment a single digital input (such as a digital input panel, digital knob, keyboard, analog knob, sliding switch, etc) on the controller allows the user to select between an arc width adjustment of 0 and 50. An arc width setting of 25 is no arc width adjustment, an arc width setting of 0 provides the maximum arc width, and an arc width adjustment of 50 is the minimum arc width in the preferred embodiment. No adjustment is having the parameters be as they were in the original program, which is typically best for flat, horizontal, welding.

The preferred embodiment uses a wire feeder design similar to the Miller S64M™ wire feeder, and a power supply design similar to the Miller XMT304™ power supply, but packaged in a single housing, or the MM251™ or a system such as that described in U.S. Pat. No. 6,107,602. The preferred wire feeder includes a digital controller, which includes a microprocessor and an memory. The controller, as described above, sets welding parameters according to factory set, or in an alternative embodiment, user-set, programs. Alternative embodiments provide that the controller is part of the power supply, or in a separate housing. The controller also receives as a user set input the arc width adjustment knob (or other input device) setting in the preferred embodiment. A user set input can be from an individual or an automated system. This input is used to scale (i.e. change from the previous setting) the program welding parameter settings, as detailed below, to adjust the arc width from a minimum to a maximum. The knob setting is stored with the other weld parameter settings in any user-created programs.

The arc width adjustment is made by adjusting five or more welding parameters simultaneously, such that other characteristics of the arc, such as arc length, are minimally affected. The inventor has determined various percentage adjustments of these parameters which is believed to adequately satisfy these objectives given the equipment used in the preferred embodiment, but other adjustments may be made, and the invention is not limited to the specific adjustments detailed below.

Referring now to FIG. 1 a typical wave form of a pulse spray welding process is shown. The wave form includes a background amperage level $B_A$ and peak amperage level of $P_A$, pulse width $P_W$ and period (1/f or 1/frequency). Also shown is the ramp up from background to peak and ramp down from peak to background. Output voltage is not shown, and is generally held constant for a constant arc length, or is adaptively controlled (such as by known adaptive voltage control, which can use peak voltage). Adaptive control, in at least one known scheme, works by modulating the pulse frequency to produce a desired arc voltage, and thus a desired arc length.

Five welding parameters: peak amps, background amps, pulse width, frequency and adaptive voltage (arc length) are adjusted according to the preferred embodiment of the present invention (or six, seven or more are adjusted according to one alternative) such that when the user adjusts the arc width one or more other arc characteristics are not changed or adversely affected.

For example, a decrease in arc width is obtained by increasing frequency. If only the frequency is changed, the arc length will increase. The present invention also adjusts background amps and pulse width, peak amps, and adaptive voltage/arc length. The magnitudes of the changes are selected to offset the increase in arc length caused by the frequency increase, resulting in a no, or little, net change in arc length. Adjusting adaptive arc voltage/length control in the present invention can be implemented by adjusting both the nominal frequency (the frequency without adaptive voltage control), and adjusting the frequency modulation (i.e., adaptive voltage) of the adjusted nominal frequency.

Each of the parameters are set by a program (a factory program or user-defined program) implemented by the wire feeder microprocessor (or analog control circuitry in an alternative embodiment). The preferred embodiment adjusts those parameters as set forth below. The specific adjustments of the preferred embodiment were determined using empirical data, and may be different in different alternatives. Thus, a decreased background amps, and a decreased pulse width. Proper adjustment of these parameters will also result in a relatively unchanged arc length. This is especially useful when welding in physically inconvenient positions.

Figure 2:
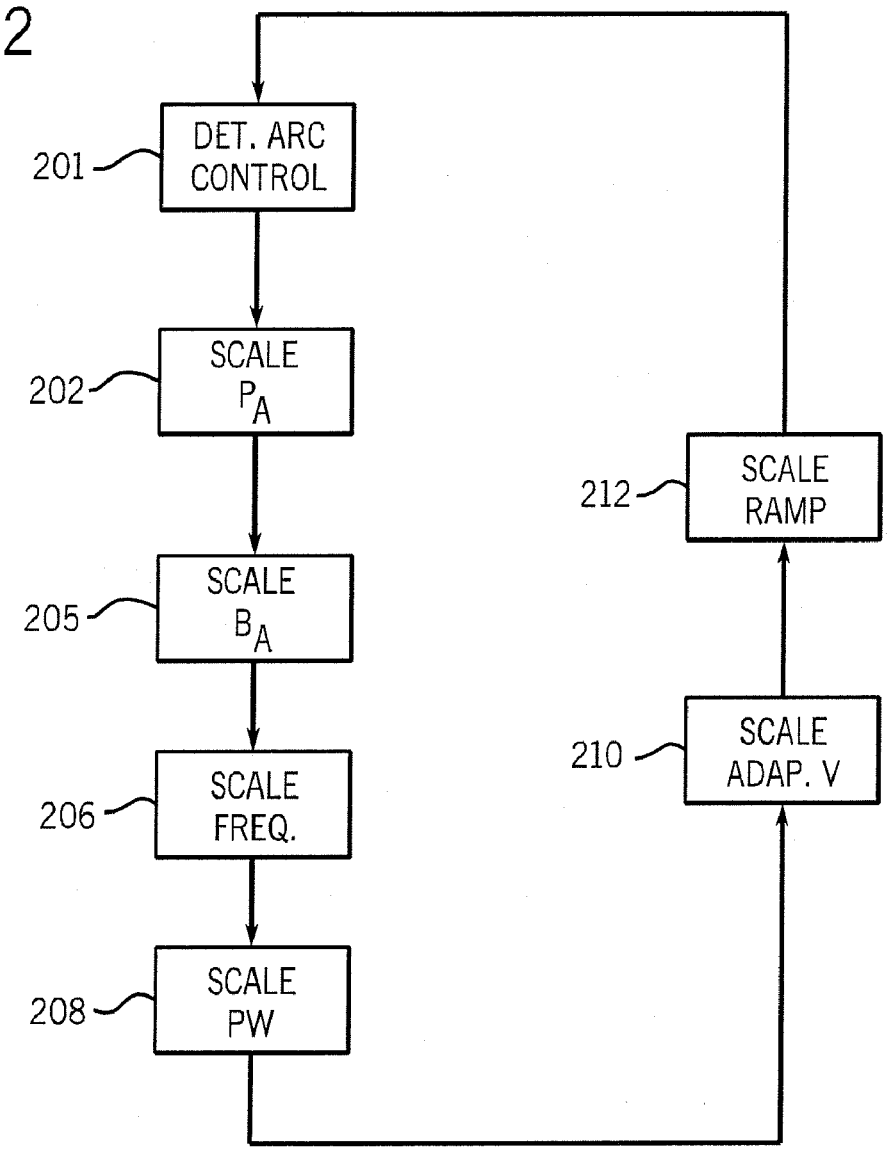
FIG. 2 is a flow chart of a program or a subroutine used to implement one embodiment of the present invention.

FIG. 2 is a flow chart showing a routine which implements one embodiment of the present invention. The flow chart is implemented with a routine in the controller for the wire feeder. The routine may be accessed on an ongoing basis, or when the welding process is initiated. The user-selected arc control is determined in a box 201. This is the input used to scale the welding parameters to change the arc width, without adversely affecting one or more other arc characteristics. The preferred embodiment uses a scalar value of between 0 and 50 for the arc width setting, for the adjustments that provide the widest and narrowest arc width. A setting of 25 provides no adjustment to the arc width.

The controller has a number of taught points. Preferably, separate taught points are provided for a number of different common materials, wire size and gas type. Pulse welding systems have various programs for common materials. According to the preferred embodiment taught points are provided for some or all of these programs, such as for 0.035 steel, 0.045 steel, 0.035 Al 4043, 0.047 Al 4043, 0.035 Al 5356, 0.047 Al 5356, 0.035 stainless and 0.045 stainless.

Taught points for a given material are provided for a number of wire feed speeds, and for at least 3 arc width settings in the preferred embodiment. (Taught point refers to setting parameters for one arc width setting at one wire feed speed). For example, in the preferred embodiment there are 8 wire feed speeds having three arc width taught points each, for a total of 24 taught points, for 0.035 steel. The arc width settings for which taught points are provided are 0, 25 and 50. It should be noted that the taught point of 25 corresponds to no adjustment for arc width. Therefore 8 of the 24 taught points are no adjustment. Each taught point has a gain for each parameter being adjusted. Thus, in the preferred embodiment each taught point has 5 gains stored in memory. Each gain is used to change, by a percentage, the nominal settings for its respective parameter. Gains are interpolated between arc width settings and between wire feed speed settings. The tables below show taught points for 0.045 stainless steel at an arc width setting of 0 and 50. The data is percentage change of various parameters, and since an arc width setting of 25 corresponds to no arc width adjustment, all gains are zero for the taught points for an arc width setting of 25. Gain, as used herein in conjunction with arc width control, refers to changing the nominal setting of an output parameter in response to an arc width setting.

| ARC WIDTH SETTING = 0 | | | | | |
|---|---|---|---|---|---|
| wfs | Adapt V | Peak Amp | Back Amp | Freq | Pw |
| 50 | 0.0 | −11.3 | 20.0 | −21.9 | 35.0 |
| 100 | −1.8 | −12.7 | 22.2 | −10.3 | 23.5 |
| 125 | −6.2 | −9.1 | 20.0 | −19.0 | 35.3 |
| 175 | 1.0 | −8.1 | 18.5 | −22.6 | 37.5 |
| 225 | 3.3 | −4.4 | 20.0 | −23.1 | 38.1 |
| 325 | 3.3 | −8.6 | 17.8 | −22.7 | 36.4 |
| 425 | 0.0 | −6.9 | 45.5 | −24.5 | 40.4 |
| 500 | 0.9 | −6.7 | 16.7 | −22.1 | 36.0 |

| ARC WIDTH SETTING = 50 | | | | | |
|---|---|---|---|---|---|
| wfs | Adapt V | Peak A | Back A | Freq | Pw |
| 50 | −9.1 | 21.0 | −20.0 | 12.5 | −27.5 |
| 100 | −8.9 | 19.7 | −16.7 | 11.8 | −30.0 |
| 125 | −4.1 | 21.2 | −32.0 | 22.8 | −23.7 |
| 175 | −9.5 | 22.4 | −47.7 | 24.5 | −27.5 |
| 225 | −11.6 | 32.9 | −62.7 | 34.6 | −34.3 |
| 325 | −12.9 | 30.0 | −66.7 | 36.9 | −36.4 |
| 425 | −12.5 | 30.6 | −68.2 | 17.0 | −36.2 |
| 500 | −12.3 | 26.7 | −70.0 | 26.8 | −38.0 |

The number of taught points is chosen to provide a smooth change over both arc widths and wire feed speeds. The gain, or data, for each taught point was empirically determined by observing the arc. Other taught points are obtained in a similar manner. The specific gains shown above are subjective and other gains may be adequate as well. Implementation of this invention is properly done by empirically determining gains for the particular system used to implement this invention.

Referring again to FIG. 2, after determining the arc width setting, the peak amps are adjusted 202 and the background amps are adjusted at 205. The frequency is adjusted at 206 and the pulse width is adjusted at 208. The adaptive voltage (frequency modulation in the preferred embodiment) is adjusted at 210, and in various embodiments the ramp up and ramp down are adjusted at 212. The ramp up and ramp down are not adjusted in the preferred embodiment. The adjustments are made for the given wire feed speed, and the gain or new weld parameters are interpolated from both arc width setting and wire feed speed.

The actual code used to implement the invention need not be described, since any number of routines can accomplish the interpolations. It is a linear interpolation in the preferred embodiment, but other interpolations are also contemplated. By interpolating over wire feed speeds the gains vary over the entire range (between the max and min wire feed speeds) of possible wire feed speeds.

While there are many ways of determining output parameters in accordance with this invention, the following examples show one manner of doing so. Using the tables above for 0.045 stainless steel, and looking at background amps, if the set points are a WFS (wire feed speed) of 425 inches per minute (IPM) and an arc width setting of 12, the percentage may be interpolated to be $(12)/25*45.5=21.8$. Thus, background amps are adjusted upward by 21.8 percent for an arc width setting of 12 at a WFS of 425.

When the WFS is between taught wire feed speed points, then another interpolation is performed. For example, given a WFS of 400 IPM and an arc width setting of 12, in addition to the calculation above, the adjustment may be calculated at a WFS of 325 and an arc width of 12, or $(12/25)*17.8=8.5$ percentage adjustment. Then, the adjustment is interpolated between the two speeds, $(400-325/(425-325)*(21.8-8.5)+8.5=18.5\%$ upward adjustment.

Another way of preforming the interpolation, is to first interpolate between wire feed speeds, and then between arc width settings. For the settings above (WFS of 400, arc width of 12), the interpolation between WFS=425 and WFS=325 for an arc width of 0 gives $(400-325)/(425-325)*(45.5-17.8)+17.8=38.6$. Then interpolating to an arc width setting of 12, the result is $(12/25)*38.6=18.5$.

It may be seen that either manner yields the same result. Other types of interpolation will provide different results, and many routines may be used to perform the calculations.

Figure 3:
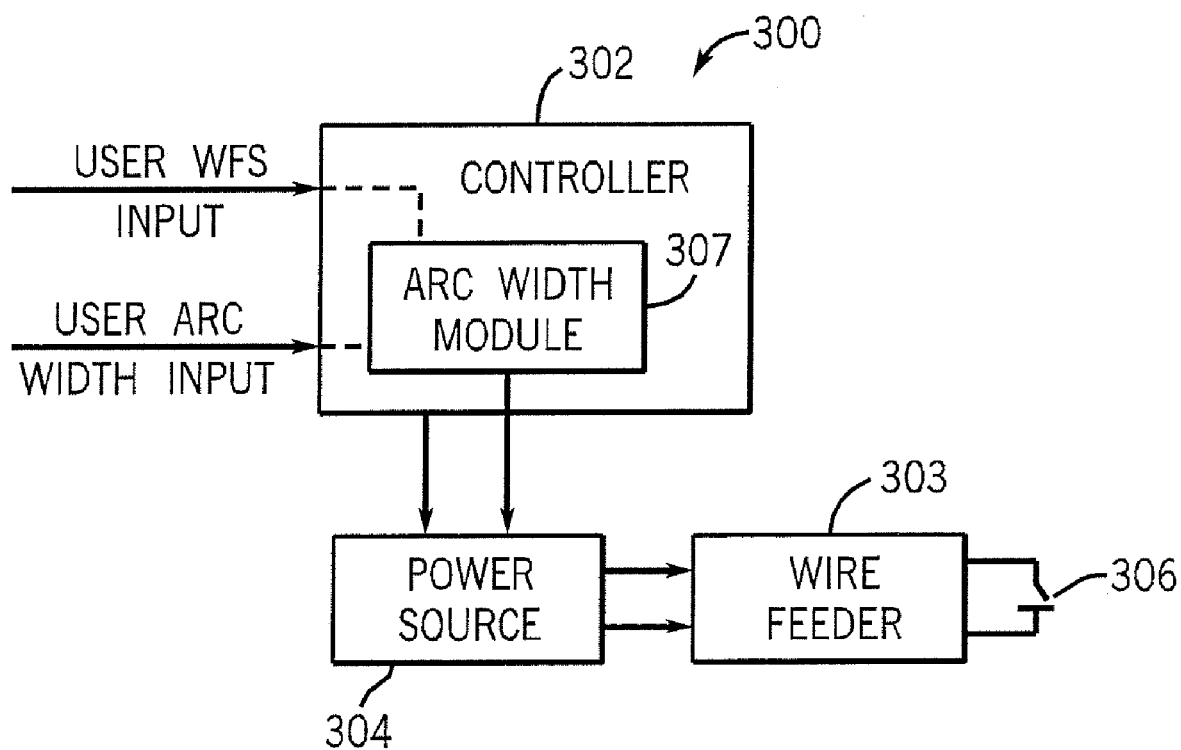
FIG. 3 is a block diagram of the preferred embodiment of the present invention.

Referring now to FIG. 3, a block diagram of a welding system 300 made in accordance with the preferred embodiment includes a controller 302, a wire feeder 303 and a power source 304 that cooperate to provide an arc 306. Controller 302 receives two user inputs, one for wire feed speed and one for arc width. These inputs are provided to an arc width control module 307 which adjusts output parameters using a welding parameter adjustment output, as set forth above to control the arc width in response to the arc width setting. Controller, as used herein, includes digital and analog circuitry, discrete or integrated circuitry, microprocessors, DSPs, etc., and software, hardware and firmware, located on one or more boards, used to control a device such as a power supply or power source. Module, as used herein, includes software and/or hardware that cooperates to perform one or more tasks, and can include digital commands, power circuitry, networking hardware, etc.

Controller 302 provides control outputs which are a control inputs to power source 304 in response to the program therein, as adjusted by the arc control module. Power source, or source of power, as used herein, includes the power circuitry such as rectifiers, switches, transformers, SCRs, etc. that process and provide the output power. Control input, as used herein, includes an input used to control a power supply, such as a set point, gate signals, phase control signals, etc. Control output, as used herein, includes an output used to control a circuit, such as a setpoint, switch signals, gate signals, phase control signals, etc.

Numerous modifications may be made to the present invention which still fall within the intended scope hereof. Thus, it should be apparent that there has been provided in accordance with the present invention a method and apparatus for controlling a welding process that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiment of the invention in which an exclusive property or privilege is claimed are defined as follow:

1. A welding power supply having an arc-width control, comprising:
   a power circuit having a welding output and at least one control input, wherein the welding output is characterized by a plurality of output welding parameters; and
   a controller, having at least one control output, connected to the at least one control input, and having a user adjustable arc-width control input, and a user adjustable wire feed speed input, wherein the controller includes an arc width control module having as inputs the wire feed speed input and the arc width control input, and having at least one welding parameter adjustment output, and wherein the at least one welding parameter adjustment output has a gain responsive to the wire feed speed input, such that there are at least three gains over a range of possible wire feed speeds.

2. The welding power supply of claim 1, wherein the at least one welding parameter adjustment output gain varies over the entire range of possible wire feed speeds.

3. The welding power supply of claim 1, wherein the at least one welding parameter adjustment output gains have at least three taught points for a given wire feed speed.

4. The welding power supply of claim 3, wherein the welding parameter adjustment output gains are interpolated between the at least three taught points.

5. The welding power supply of claim 1, wherein the plurality of output welding parameters include peak amps, background amps, pulse width, frequency, adaptive voltage, ramp up and ramp down, and the at least one welding parameter adjustment includes adjustments for at least three of the plurality of output parameters.

6. The welding power supply of claim 5, wherein the at least one welding parameter adjustment includes adjustments for at least five of the plurality of output parameters.

7. The welding power supply of claim 6, wherein the at least one welding parameter adjustment includes adjustments for at least six of the plurality of output parameters.

8. A welding power supply having an arc-width control, comprising:
   power means for providing a welding output in response to at least one control input, wherein the welding output is characterized by a plurality of output welding parameters; and
   control means for controlling the power means with at least one control output connected to the at least one control in response to a user adjustable arc-width control input and a user adjustable wire feed speed input, wherein the control means includes an arc width control means for controlling arc width, and having as inputs the wire feed speed input and the arc-width control input, and having at least one welding parameter adjustment output, and wherein the at least one welding parameter adjustment output has a gain responsive to the wire feed speed input, such that there are at least three gains over a range of possible wire feed speeds.

9. The welding power supply of claim 8, wherein the at least one welding parameter adjustment output gain varies over the entire range of possible wire feed speeds.

10. The welding power supply of claim 9, wherein the at least one welding parameter adjustment output gains have at least three taught points for a given wire feed speed.

11. The welding power supply of claim 10, further including means for interpolating the welding parameter adjustment output gains are between the at least three taught points.

12. The welding power supply of claim 8, wherein the plurality of output parameters include peak amps, background amps, pulse width, frequency, adaptive voltage, ramp up and ramp down, and the at least one welding parameter adjustment includes adjustments for at least three of the plurality of output parameters.

13. The welding power supply of claim 12, wherein the at least one welding parameter adjustment includes adjustments for at least five of the plurality of output parameters.

14. The welding power supply of claim 13, wherein the at least one welding parameter adjustment includes adjustments for at least six of the plurality of output parameters.

15. A method of providing welding power with arc width control, comprising:

providing welding power, wherein the power is characterized by a plurality of output parameters; and controlling the power, and the plurality of output parameters, in response to a user adjustable output set point; and controlling arc width and the user adjustable set point in response to a user adjustable arc-width control input, by adjusting the plurality of output parameters with a gain, wherein the gain has at least three values over a range of possible user adjustable output set points.

16. The method of claim 15, wherein the user adjustable output set point is a wire feed speed setting.

17. The method of claim 16, wherein the gain varies over the entire range of possible user adjustable output set points.

18. The method of claim 15, wherein the gain varies over the entire range of possible user adjustable output set points.

19. The method of claim 18, wherein the gains have at least three taught points for a given wire feed speed.

* * * * *